(12) United States Patent
Hallmark

(10) Patent No.: US 7,878,519 B2
(45) Date of Patent: Feb. 1, 2011

(54) ELECTRIC SLIDE STEP FOR RECREATIONAL VEHICLE

(76) Inventor: Julian W. Hallmark, 7812 FM 3136, Alvarado, TX (US) 76009

( * ) Notice: Subject to any disclaimer, the term of this patent is extended or adjusted under 35 U.S.C. 154(b) by 1093 days.

(21) Appl. No.: 11/365,552

(22) Filed: Mar. 1, 2006

(65) Prior Publication Data
US 2007/0205573 A1    Sep. 6, 2007

(51) Int. Cl.
*B60R 3/02* (2006.01)
(52) U.S. Cl. ........................ 280/166; 280/163
(58) Field of Classification Search ............... 280/163, 280/166, 169
See application file for complete search history.

(56) References Cited

U.S. PATENT DOCUMENTS

| | | | |
|---|---|---|---|
| 3,291,504 A * | 12/1966 | Irizarry | 280/166 |
| 3,817,554 A | 6/1974 | Cuffe et al. | |
| 3,955,827 A | 5/1976 | Wonigar | |
| 4,073,502 A | 2/1978 | Frank et al. | |
| 4,110,673 A | 8/1978 | Nagy et al. | |
| 5,228,707 A * | 7/1993 | Yoder | 280/166 |
| 5,505,476 A | 4/1996 | Maccabee | |
| 5,547,040 A | 8/1996 | Hanser et al. | |
| 5,660,405 A | 8/1997 | Campbell | |
| 5,957,237 A * | 9/1999 | Tigner | 182/127 |
| 6,213,486 B1 | 4/2001 | Kunz et al. | |
| 6,655,706 B1 | 12/2003 | Murrell | |
| 2003/0132595 A1* | 7/2003 | Fabiano et al. | 280/166 |

FOREIGN PATENT DOCUMENTS

GB    2045699 A  * 11/1980

* cited by examiner

*Primary Examiner*—J. Allen Shriver, II
*Assistant Examiner*—Katy Meyer

(57) ABSTRACT

An electric slide step for a recreational vehicle assists users in entering and existing the vehicle. A step housing is mounted to the vehicle beneath the exterior door. The housing has steps that are movable on inclined slides between a retracted position when not in use and an extended position for assisting uses while entering and exiting the vehicle through the exterior door.

20 Claims, 5 Drawing Sheets

ELECTRIC SLIDE STEP FOR RECREATIONAL VEHICLE

BACKGROUND OF THE INVENTION

1. Technical Field

The present invention relates in general to an automated step device and, in particular, to an improved system, method, and apparatus for an electric slide step for a recreational vehicle.

2. Description of the Related Art

Recreational vehicles typically have exterior doors that are elevated well above the surface supporting the vehicle. Access to recreational vehicles can be difficult and even unsafe, especially for older persons who often use such vehicles. A series of permanent steps attached beneath the doorway to permit easy access are not practical, since the steps would decrease the effective clearance of the vehicles and extend the width or length of the vehicle as well. Such steps are typically mounted to the RV frame for stability and are best provided at a point somewhat outside the vertical plane formed by the side of the RV, so that a person exiting the RV may step through the door while facing forward.

Any step fixed at a location outside the vertical plane formed by the side of the RV poses a hazard when the RV is in motion. For that reason, it is helpful to have a step that may be extended when the vehicle is stationary, and retracted when the vehicle is in motion. Various steps capable of this function have been proposed. For example, U.S. Pat. No. 3,955,827, discloses a stowable step for vehicles, the stowing action of which is accomplished by a system of slotted supports and links which work to fold the step under the vehicle. That design is complicated, using many moving parts to accomplish this stowing function. Other typical systems are likewise complicated. They may require specialized tools to assemble or attach them to the frame. They may be sufficiently complicated that it is practical only to assemble the entire system at the point of manufacture, which leads to increased costs for shipping the unit or for attaching it to the RV frame. Additionally, they may be susceptible to breakdown or malfunction because of the failure of one of many parts.

U.S. Pat. No. 3,876,230 discloses foldable camper steps that pivot on one another until they reach a fully retracted position. Each of the steps is formed from an L-shaped member. However, several problems exist with the application of this step assembly to a recreational vehicle. The door of a recreational vehicle is typically on the side. As such, very little or no increase in width beyond the door can be allowed by the steps when they are not in use. Even when fully retracted, the steps extend at least the width of one step beyond the door. Another problem with the Phillips steps is in the shallowness of the depth of the step treads. A user may not be able to fit his or her entire foot onto the tread.

U.S. Pat. No. 3,408,959 discloses a folding staircase which functions as a raised step for use with high-level platforms, as well as a pair of steps for lower-level platforms. This step assembly includes an upper tread and a lower tread linked together and actuated by the flotation of a pivot arm and an associated link through a chain drive, powered by a motor. When these steps are in a fully retracted position, an outside wall or member forms a part of the exterior of the vehicle.

U.S. Pat. No. 4,106,790 discloses a retractable vehicle step that swings into a retracted position. The step is mounted on the side of a recreational vehicle and stowed beneath the door under the side of the vehicle when not in use. However, since only one steps is disclosed, safe and convenient access may be somewhat less than desirable. If the frame height of the step is kept within a reasonable range for ground clearance purposes, the distance from the step to the ground may be excessive. If the step did project lower, the distance from the door threshold to the step may be excessive.

U.S. Pat. No. 4,424,751 discloses a step assembly for rail cars, which is raised and lowered by two parallel guide brackets. This step assembly contains an upper and a lower tread. When the lower tread is in its retracted position the bottom surface of the step conforms to the exterior of the rail car. However, the step assembly does reduce the amount of usable floor space within the rail car due to the operation and structure of the step assembly.

U.S. Pat. No. 3,807,757 also discloses a step assembly for campers, trucks, and other recreational vehicles. The step assembly has upper, center, and lower treads. When the step assembly is in its fully retracted position, the bottom of the lower tread faces outwardly. However, even in its fully retracted position the step assembly does add additional width to the side of the recreational vehicle to which it is attached. As is typical in such step assemblies, the carpenter step assembly is rather unsightly when in a fully folded position.

Another problem associated with the retracting and extending function of the step is the need to keep the step in the desired position while maintaining ease of movement between the retracted and extended positions. When the RV is in motion, bumps or sharp turns in the roadway might induce the step to move unexpectedly from the retracted position, creating a hazard. Alternatively, when the RV is stationary, a person stepping onto the step might be injured if the stepping force caused the step to move unexpectedly toward the retracted position.

It is therefore desirable to have a step that includes relatively few moving parts, that may be assembled remotely from the point of manufacture and assembled and attached to the frame without the use of specially adapted tools, and which is capable of being placed and maintained in either a retracted or extended position.

SUMMARY OF THE INVENTION

One embodiment of a system, method, and apparatus for an electric slide step for a recreational vehicle assists users in entering and existing the vehicle. The invention uses a housing that is mounted to the vehicle beneath the exterior door. The housing has horizontal steps that are mounted on inclined slides. The steps are movable between a retracted position inside the housing when not in use, and an extended position away from the housing for assisting users while entering and exiting the vehicle through the exterior door. In the retracted position, the steps are substantially hidden and, in the extended position, the steps provide graduated changes in elevation for the user.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
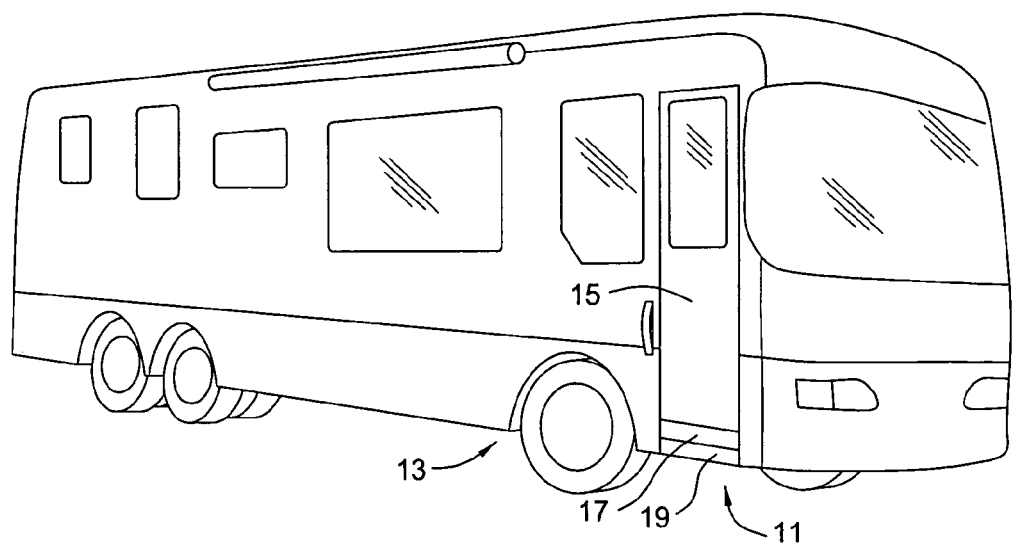
FIG. 1 is an isometric view of one embodiment of a step assembly installed on a vehicle and in a retracted position, and is constructed in accordance with the invention.
Figure 2:
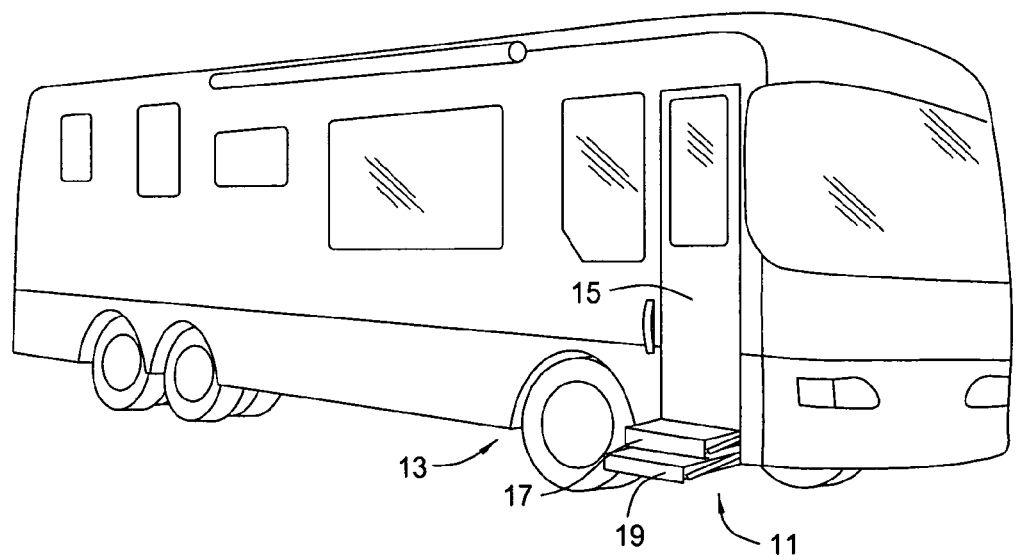
FIG. 2 is an isometric view of the step assembly and vehicle of FIG. 2 and in an extended position, and is constructed in accordance with the invention.

Referring to FIGS. 1 and 2, one embodiment of a system, method, and apparatus for facilitating the ingress and egress of a vehicle, such as a recreational vehicle, is disclosed. The invention comprises a frame, chassis, or housing 11 that is mounted to a recreational vehicle 13 adjacent to and beneath an exterior door 15 thereof. The housing 11 has a rectangular, box-like shape and has at least one movable step (e.g., two shown: upper step 17 and lower step 19). The steps 17, 19 are movable between a retracted position (FIG. 1) when not in use and an extended position (FIG. 2) for assistance in entering and exiting the recreational vehicle 13 through the exterior door 15. In the retracted position, the steps 17, 19 are substantially recessed within the housing 11 such that they would not interfere with motion of the vehicle 13 when it is being driven.

Figure 3:
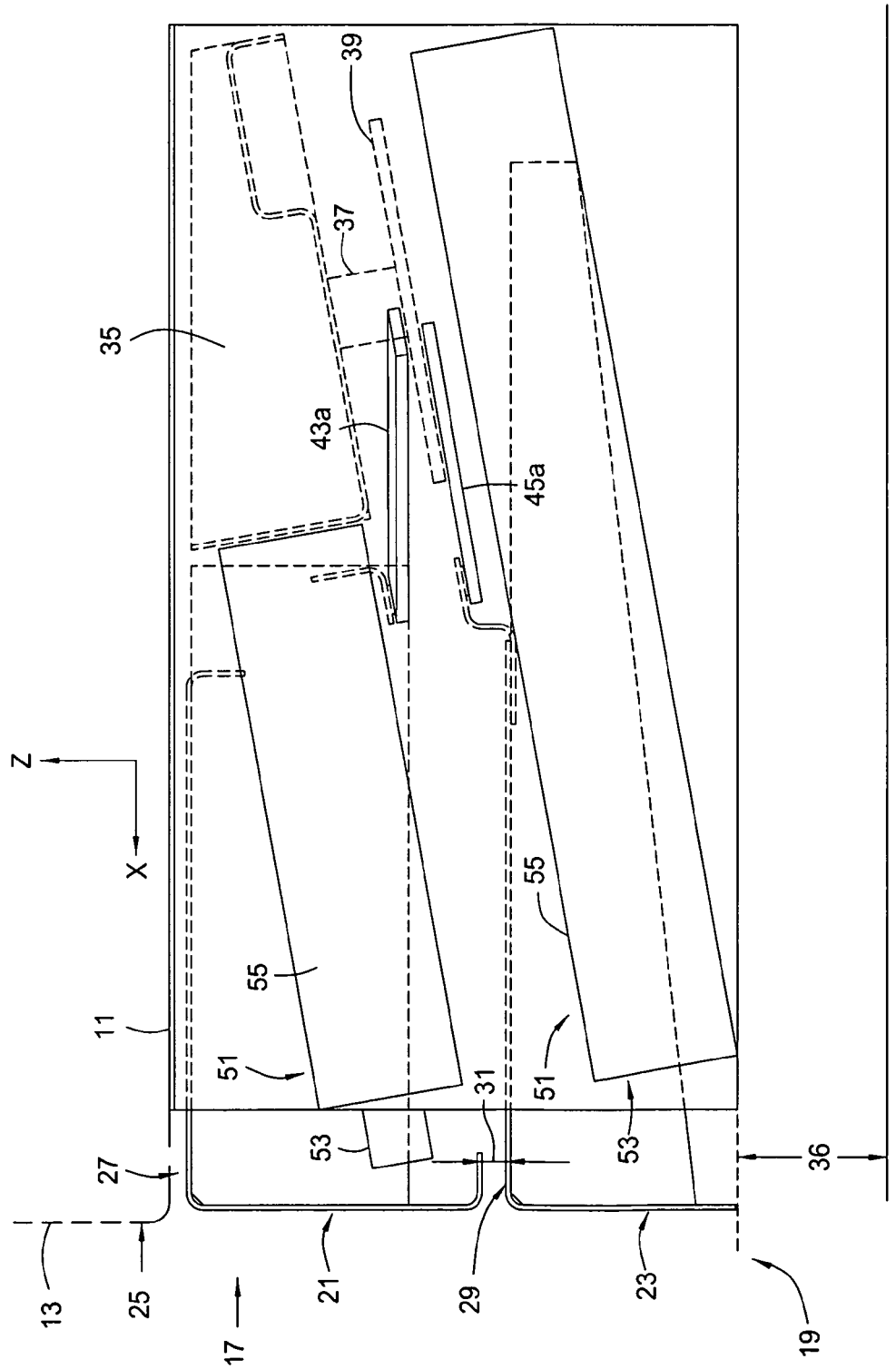
FIG. 3 is an enlarged schematic side view of one embodiment of the step assembly of FIGS. 1 in a retracted position and is constructed in accordance with the invention.
Figure 4:
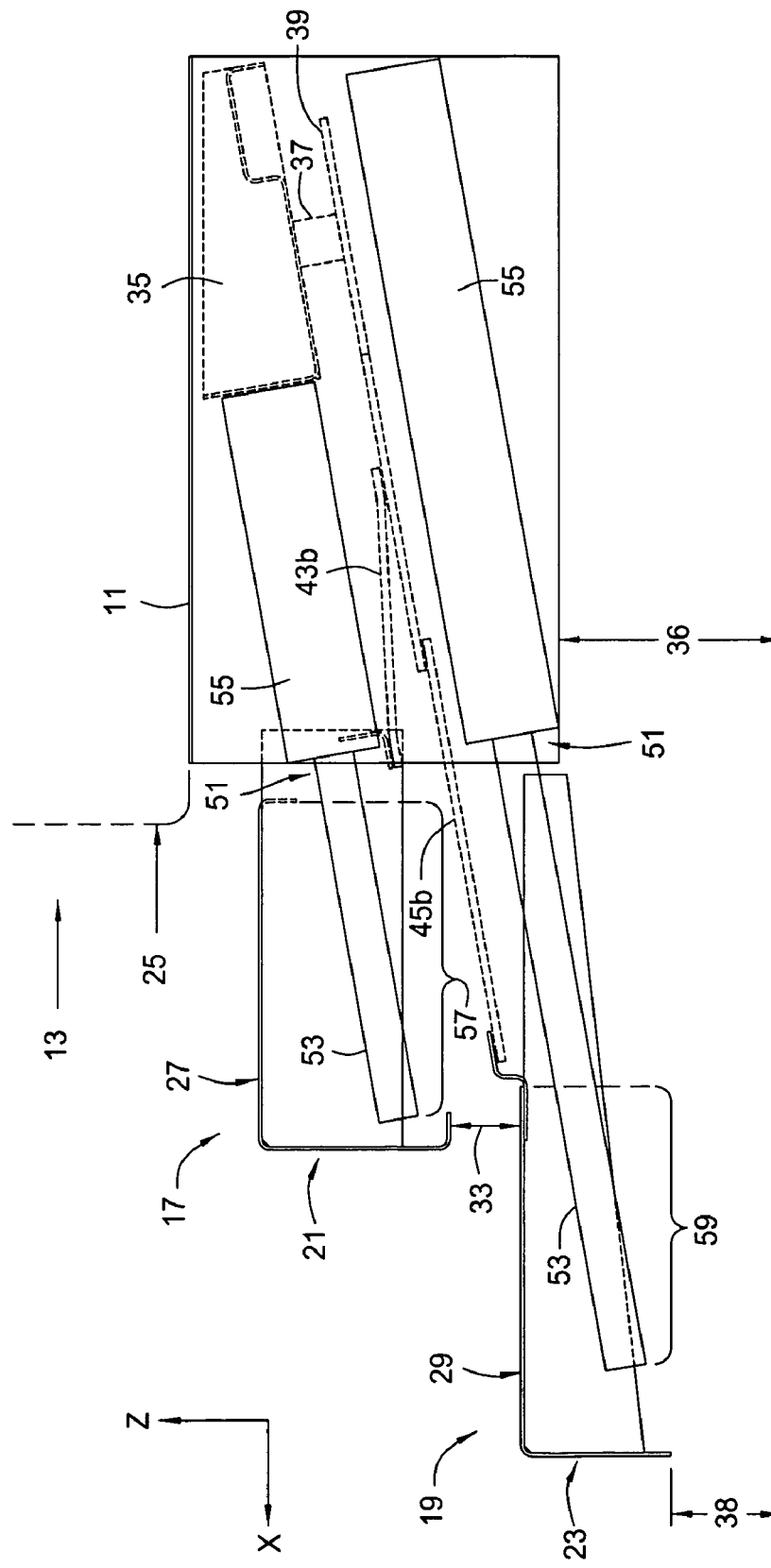
FIG. 4 is a schematic side view of the step assembly of FIG. 3 in an extended position and is constructed in accordance with the invention.
Figure 5:
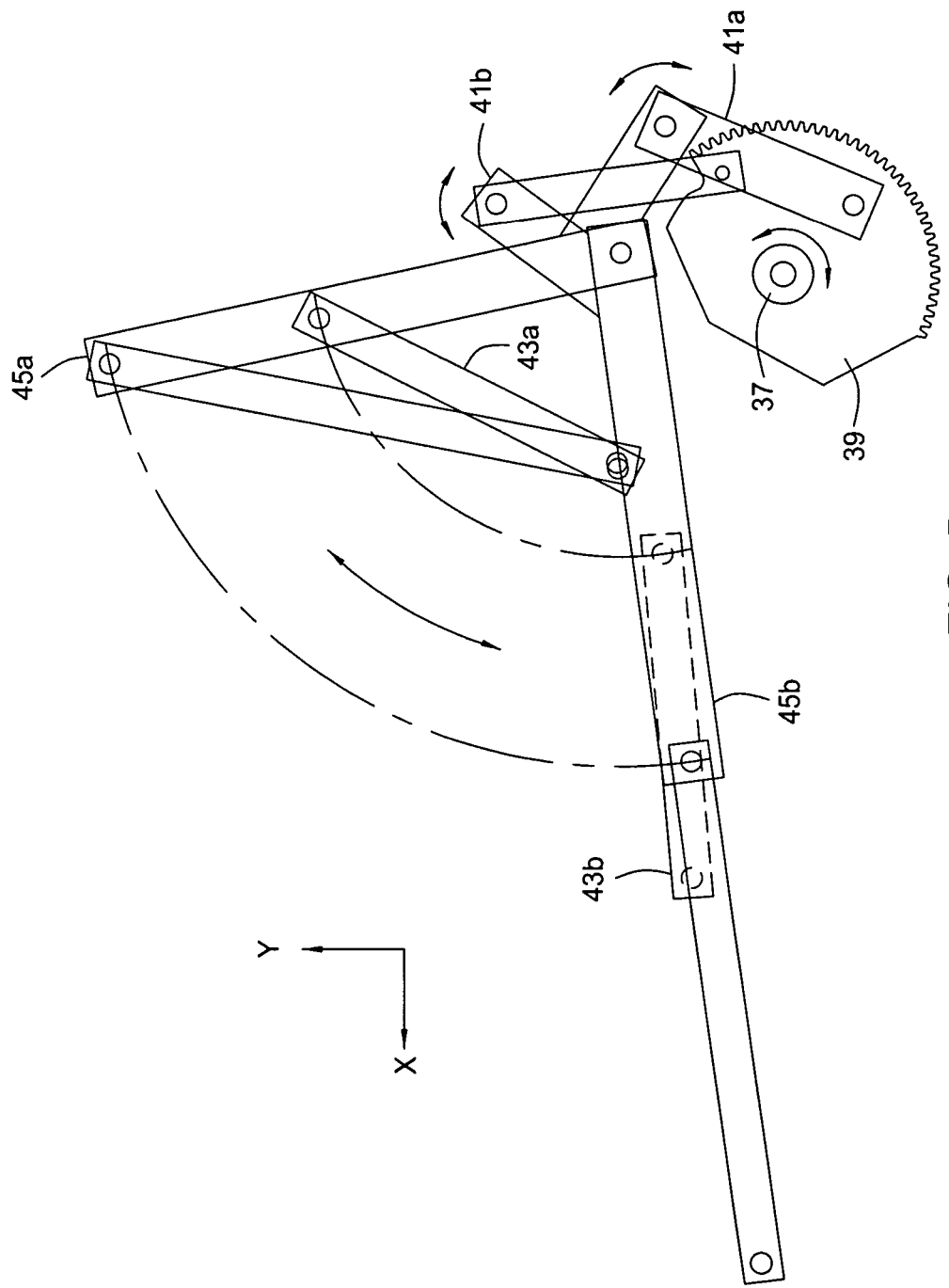
FIG. 5 is a schematic top view of portions of the step assembly of FIGS. 3 and 4 illustrating both the retracted and extended positions (with the steps removed) and is constructed in accordance with the invention.
Figure 6:
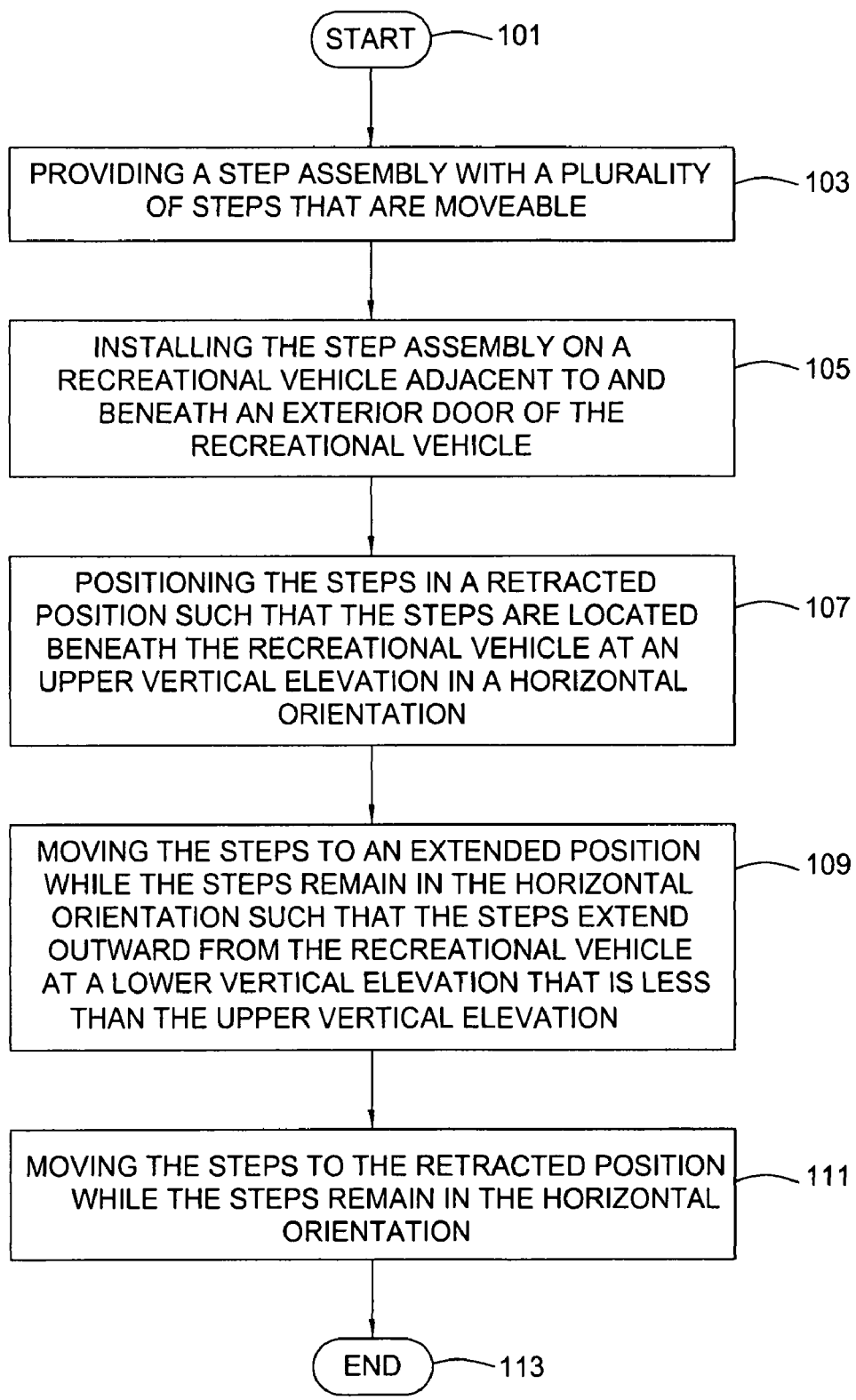
FIG. 6 is a high level flow diagram of one embodiment of a method in accordance with the invention.

Referring now to FIGS. 3-5, more detailed views of the apparatus of the invention are shown. In the retracted position of FIG. 3, the vertical outer surfaces 21, 23 of the steps 17, 19, respectively, may be substantially flush with or parallel to each other along an x-axis (see coordinate system). In addition, surfaces 21, 23 may be substantially parallel to outer vertical surface 25 (see dashed lines) of vehicle 13 as shown, or recessed therefrom in the negative x-direction, so as to maintain a smooth, clean appearance on the exterior of the vehicle 13.

In one embodiment, each of the steps 17, 19 has a stepping surface 27, 29, respectively, that defines a horizontal plane (i.e., parallel to the x-y plane; see FIG. 5). The steps 17, 19 have an upper vertical elevation in the retracted position (FIG. 3), and a lower vertical elevation in the extended position (FIG. 4). The lower vertical elevation of each step is less (i.e., lower in the z-direction) than the upper vertical elevation of each step, respectively. In one embodiment, the steps 17, 19 always remain horizontally oriented during movement between the retracted and extended positions in both directions. The lower step 19 extends further from the housing 11 (i.e., in the x-direction) than the upper step 17 when the steps are in the extended position.

Comparing FIGS. 3 and 4, a vertical distance 31 between the upper and lower steps 17, 19 in the retracted position is less than a vertical distance 33 therebetween in the extended position. Thus, the vertical distance between the steps 17, 19 increases as they extend, and decreases as they retract. As a result the ground clearance (e.g., the distance between the ground 34 that supports the vehicle 13 and the lowermost portion of the step assembly) is variable. For example, maximum ground clearance 36 of FIGS. 3 and 4 (i.e., the distance between ground 34 and housing 11 or lower step 19 in the retracted position) is greater than the minimum ground clearance 38 (FIG. 4) between the ground 34 and lower step 19 when it is in the extended position.

In one embodiment, the invention is automated with an electric motor 35 that is mounted to (e.g., inside) the housing 11 for automatically moving the step between the retracted and extended positions. The motor 35 is mounted at an inclined angle (approximately 10 degrees from horizontal) as shown for reasons that will become apparent. The motor 35 has a drive shaft 37, a cam 39 mounted to the drive shaft 37, and a linkage assembly extending between the cam 39 and the steps 17, 19 for moving the steps 17, 19 between the retracted and extended positions.

As best shown in FIG. 5, the linkage assembly may comprise a plurality of flat arms that move in planes between the retracted and extended positions. In the retracted or "a" position, the cam 39 is fully rotated clockwise and a primary linkage assembly 41a extends from it to upper and lower linkages 43a, 45a. Upper and lower linkages assemblies 43a, 45a, are connected to portions of steps 17, 19, respectively. When cam 39 is rotated counter-clockwise to the extended or "b" position, primary linkage assembly 41b pushes upper and lower linkage assemblies 43b, 45b outward to extend the steps 17, 19, respectively, for operational use. Each linkage assembly 43a, 45b, moves in a separate plane to manipulate their respective steps 17, 19.

In one embodiment, the invention utilizes slides 51 to move the steps 17, 19 back and forth between the retracted and extended positions. The slides 51 are mounted between the steps 17, 19 and the housing 11 for facilitating linear sliding movement of the steps 17, 19 relative to the housing 11. In the embodiment shown, each step 17, 19 uses two slides 51, with one on each side (e.g., x-z surfaces). Each step 17, 19 is mounted on a pair of rails 53 that are supported by and slidably movable relative to a pair of stationary tracks 55 mounted to the housing 11. To align with the inclined motor 35, the slides 51 are also inclined at an acute angle relative to horizontal. Thus, linear movement of steps 17, 19 produces motion in both the x-direction and the z-direction, which allows the slides 51 to translate both horizontal and vertical forces on the steps 17, 19 to the housing 11.

In one embodiment (FIG. 4), certain forward portions 57, 59 of the slides 51 (i.e., rails 53) mounted to the steps 17, 19, respectively, are located completely beneath the stepping surfaces 27, 29, respectively, in a vertical direction when the steps 17, 19 are in the both the retracted and extended positions.

The invention also comprises a method of facilitating the ingress and egress of a recreational vehicle. The method begins as indicated at step 101, and comprises providing a step assembly with a plurality of steps that are movable (step 103); installing the step assembly on a recreational vehicle adjacent to and beneath an exterior door of the recreational vehicle (step 105); positioning the steps in a retracted position such that the steps are located beneath the recreational vehicle at an upper vertical elevation in a horizontal orientation (step 107); moving the steps to an extended position while the steps remain in the horizontal orientation such that the steps extend outward from the recreational vehicle at a lower vertical elevation that is less than the upper vertical elevation for assisting a user thereof in entering and exiting the recreational vehicle through the exterior door (step 109); moving the steps to the retracted position while the steps remain in the horizontal orientation (step 111); before ending as indicated at step 113.

The method may further comprise increasing a vertical distance between the steps as the steps move from the retracted position to the extended position, and decreasing the vertical distance between the steps as the steps move from the extended position to the retracted position. The method also may further comprise automatically moving the step between the retracted and extended positions with an electric motor; and/or articulating the steps with the electric motor having a drive shaft, a cam mounted to the drive shaft, and a linkage assembly extending between the cam and the step; and/or moving the linkage assembly in a plurality of planes between the retracted and extended positions.

In one embodiment of the method, each step has a stepping surface that defines a horizontal plane, slides are mounted between the steps and a housing for facilitating sliding movement of the steps relative to the housing, and portions of the slides mounted to the steps are located completely beneath the stepping surfaces in a vertical direction. In another embodiment, the slides are parallel to each other and oriented at acute angles relative to horizontal and the steps such that the slides translate both horizontal and vertical forces on the steps to the housing.

While the invention has been shown or described in only some of its forms, it should be apparent to those skilled in the art that it is not so limited, but is susceptible to various changes without departing from the scope of the invention.

What is claimed is:

1. A step assembly, comprising:
   a housing having a plurality of steps, each of said steps being mounted to slides for moving the steps between a retracted position and an extended position, each step having one of said slides at each opposite end of the step, and said slides being inclined at a fixed angle relative to said step;
   the steps having an upper vertical elevation in the retracted position, a lower vertical elevation in the extended position, and the lower vertical elevation is less than the upper vertical elevation;
   the steps being horizontal in both the retracted and extended portions;
   the steps being vertically separated by a retracted vertical distance in the retracted position and an extended vertical distance in the extended position with the retracted vertical distance being less than the extended vertical distance, and
   the slide at one end of each step being parallel to and spaced from the slide at a corresponding end of a next successive step.

2. A step assembly according to claim 1, wherein each step has a stepping surface that defines a respective horizontal plane, the slides extend between the housing and the steps in the extended position, and portions of the slides mounted to the steps are located completely beneath the respective stepping surfaces in a vertical direction.

3. A step assembly according to claim 1, wherein the steps comprise an upper step and a lower step, and the lower step extends further from the housing than the upper step when the steps are in the extended position.

4. A step assembly according to claim 1, further comprising an electric motor mounted to the housing for automatically moving the steps between the retracted and extended positions.

5. A step assembly according to claim 4, wherein the electric motor has a drive shaft, a cam mounted to the drive shaft, and a linkage assembly extending between the cam and the steps for simultaneously moving both steps between the retracted and extended positions.

6. A step assembly according to claim 5, wherein the linkage assembly comprises a plurality of flat arms that move in separate plane, respective to the steps, between the retracted and extended positions.

7. A system for facilitating the ingress and egress of a recreational vehicle, comprising:
   a housing adapted to be mounted to the recreational vehicle adjacent to and beneath an exterior door thereof, the housing having at least two steps that are movable between a retracted position when not in use and an extended position for assistance in entering and exiting the recreational vehicle through the exterior door;
   the steps having an upper vertical elevation in the retracted position, a lower vertical elevation in the extended position, with the lower vertical elevation being less than the upper vertical elevation, such that the steps always remains horizontal during movement between the retracted and extended positions,
   each step having a slide at opposite ends of the step, and said slides being inclined at a fixed angle relative to said steps,
   the steps being vertically separated by a retracted vertical distance in the retracted position and an extended vertical distance in the extended position with the retracted vertical distance being less than the extended vertical distance, and
   the slide at one end of each step being parallel to and spaced from the slide at a corresponding end of a next successive step.

8. A system according to claim 7, wherein the step comprises an upper step and a lower step, and the lower step extends further from the housing than the upper step when the steps are in the extended position.

9. A system according to claim 7, further comprising an electric motor mounted to the housing for automatically moving the step between the retracted and extended positions.

10. A system according to claim 9, wherein the electric motor has a drive shaft, a cam mounted to the drive shaft, and a linkage assembly extending between the cam and the step for moving the step between the retracted and extended positions.

11. A system according to claim 10, wherein the linkage assembly comprises a plurality of flat arms that move in a plane between the retracted and extended positions.

12. A system according to claim 7, wherein the step has a stepping surface that defines a horizontal plane, each slide is mounted between the step and the housing for facilitating sliding movement of the step relative to the housing, and a portion of the slide mounted to the step is located completely beneath the stepping surface in a vertical direction in both the retracted and extended positions.

13. A system according to claim 12, wherein the slide is oriented at an acute angle relative to horizontal and the step such that the slide translates both horizontal and vertical forces on the step to the housing.

14. A method of facilitating the ingress and egress of a recreational vehicle, comprising:
   (a) providing a step assembly with a plurality of steps that are movable;
   (b) installing the step assembly on a recreational vehicle adjacent to and beneath an exterior door of the recreational vehicle;

(c) positioning the steps in a retracted position such that the steps are located beneath the recreational vehicle at an upper vertical elevation in a horizontal orientation;

(d) mounting each step in a slide at opposite ends of the step, with the slides being inclined at a fixed angle relative to said steps, with the slide at one end of each step being parallel to and spaced from the slide at a corresponding end of a next successive step;

(e) moving the steps to an extended position while the steps remain in the horizontal orientation such that the steps extend outward from the recreational vehicle at a lower vertical elevation that is less than the upper vertical elevation for assisting a user thereof in entering and exiting the recreational vehicle through the exterior door;

(f) moving the steps to the retracted position while the steps remain in the horizontal orientation, and (g) increasing a vertical distance between the steps as the steps move from the retracted position to the extended position, and decreasing the vertical distance between the steps as the steps move from the extended position to the retracted position.

15. A method according to claim 14, wherein the steps comprise an upper step and a lower step, and extending the lower step further from the housing than the upper step when the steps are in the extended position.

16. A method according to claim 14, further comprising automatically moving the step between the retracted and extended positions with an electric motor.

17. A method according to claim 16, further comprising articulating the steps with the electric motor having a drive shaft, a cam mounted to the drive shaft, and a linkage assembly extending between the cam and the step.

18. A method according to claim 17, further comprising moving the linkage assembly in a plurality of planes between the retracted and extended positions.

19. A method according to claim 14, wherein each step has a stepping surface that defines a horizontal plane, the slides are mounted between the steps and a housing for facilitating sliding movement of the steps relative to the housing, and portions of the slides mounted to the steps are located completely beneath the stepping surfaces in a vertical direction.

20. A method according to claim 19, wherein the slides are parallel to each other and oriented at acute angles relative to horizontal and the steps such that the slides translate both horizontal and vertical forces on the steps to the housing.

* * * * *